United States Patent

Weinstein

[15] 3,675,475
[45] July 11, 1972

[54] MATERIAL TESTING DEVICE FOR THE CONTINUOUS MEASUREMENT OF STRESS RELAXATION

[72] Inventor: Warren D. Weinstein, Huntington Station, N.Y.

[73] Assignee: Sperry Rand Corporation

[22] Filed: May 25, 1970

[21] Appl. No.: 40,032

[52] U.S. Cl. .................................................73/89, 73/99
[51] Int. Cl. .........................................................G01b 7/16
[58] Field of Search .................73/89, 88 R, 99, 15.6, 101, 73/88.5

[56] References Cited

UNITED STATES PATENTS 3,460,380  8/1969  Furr .............................................73/99
3,282,091  11/1966  Plazek .........................................73/99

OTHER PUBLICATIONS

Instrument Technology, Vol. III, by Jones Publ. in London, 1957, pp. 36–37.

Primary Examiner—Richard C. Queisser
Assistant Examiner—Marvin Smollar
Attorney—S. C. Yeaton and R. V. Craddock

[57] ABSTRACT

An apparatus in which one end of a material test specimen is affixed to a calibrated plate on a stationary housing and the other end is affixed to a rotatable element within the housing. A calculated stress is applied to the test specimen by rotating the calibrated plate through a specific angular displacement. An electromagnetic spring field applies a torque proportional to rotational displacement of the test specimen. The angular displacement is sensed by an electromagnetic pick-off which controls a torque motor that applies a sufficient torque to the rotatable element to maintain it at a null position. Any stress relaxation within the specimen results in movement of the rotatable element. Such movement is sensed by the electromagnetic pick-off which generates an error signal that is applied to the torque motor which returns the rotatable element to its null position. The error signal is a measure of the stress relaxation within the material and is routed to a recorder.

3 Claims, 2 Drawing Figures

INVENTOR
WARREN D. WEINSTEIN
BY

*HP Ferry*
ATTORNEY

3,675,475

MATERIAL TESTING DEVICE FOR THE CONTINUOUS MEASUREMENT OF STRESS RELAXATION

BACKGROUND OF THE INVENTION

1. Field of the Invention

This invention relates to testing machines particularly to machines for measuring the characteristics of materials. When a material is subjected to an external force that causes the material to changes its shape, the material is said to be deformed. Deformation is described in terms of stresses and strains in the material. Stress is quantitatively defined as the amount of the external force divided by the area of the material upon which it acts. Strain is a measure of the extent of deformation. If, when the deforming force is removed, the material returns to its original shape within a relatively short period of time it is said to be elastic. If the material does not return to its original shape, it is said to become plastic. For all solid materials the application of a sufficiently large force will cause the material to become plastic. The stress at which this occurs is called the elastic limit. It is well known that a material will return to its original shape when the stress impressed on it has not exceeded its elastic limit. However, a lesser known phenomena is the dynamics involved in materials which are subjected to a stress below the elastic limit for an extended period of time. It has been noted in materials used for relay contacts and flexure devices incorporated in miniature inertial instruments that a permanent deformation has occurred in the material even though the applied stress was well below its elastic limit. The internal stress within the material reacting to the externally applied force decreases with time and the material becomes plastic causing permanent deformation. This time dependent decrease in stress in a constrained material is called stress relaxation.

2. Description of the Prior Art

In the prior art, stress relaxation is measured by calculating a stress below the elastic limit of the test specimen that will give a specific strain, measuring the dimensions of the specimen before application of the load, applying the load for an extended period of time, for example, 500 or 1,000 hours, removing the load and measuring the dimensions. Since the dimensional variations are extremely small, in the order of thousandths of an inch, a microscope is usually employed to make these measurements. Any permanent change in the dimensions will be the result of the material becoming plastic. A new stress is calculated based on the new dimensions. The difference between the original stress and the new stress is a measure of the stress relaxation in the material. The foregoing process is performed repetitively to obtain a plot of stress relaxation versus time for constant strain. The validity of data obtained using this procedure is questionable because the strain is not held constant. In another procedure, the specimen is held at constant load and each time the strain increases the load is partially removed to return the specimen to its original size. Again in this test the strain is not held constant. This deficiency can be minimized by decreasing the periods of time between readjustment of the load. The present invention is a novel improvement over the prior art in that it provides continuous measurement of stress relaxation and automatic control of the applied load while maintaining the strain constant in the material test specimen.

SUMMARY OF THE INVENTION

In the present invention the strain is held constant while indirect continuous measurement of stress within the test specimen is performed. The test specimen is mounted between a calibrated plate on a stationary housing and a rotatable element. A specific stress is calculated and the calibrated plate is displaced an initial angular amount until the test specimen is subjected to the calculated stress. The calibrated plate is then secured in its displaced position. Since the stress below the elastic limit is proportional to strain, the angular displacement of the calibrated plate is proportional to the strain in the test specimen. Once the calibrated plate is fixed in its displaced position, only the rotatable element will move when stress relaxation of the test specimen occurs. Monitoring the position of the rotatable element is an indirect measure of the strain. The strain is effectively held constant by maintaining the position of the rotatable element constant during the test. This is accomplished in the present invention by a suitable sensing means which detects any change in the position of the rotatable element after the initial angular displacement of the test specimen. The sensing means generates an error signal that is used to drive a torque motor. The torque developed returns the rotatable element to its null position effectively maintaining the strain constant. The torque required to return the rotatable element to its original position is proportional to the stress relaxation in the material. Therefore, using the error signal to drive a recorder produces an indirect measure of the plot of stress relaxation versus time.

DESCRIPTION OF THE PREFERRED EMBODIMENT

Figure 1:
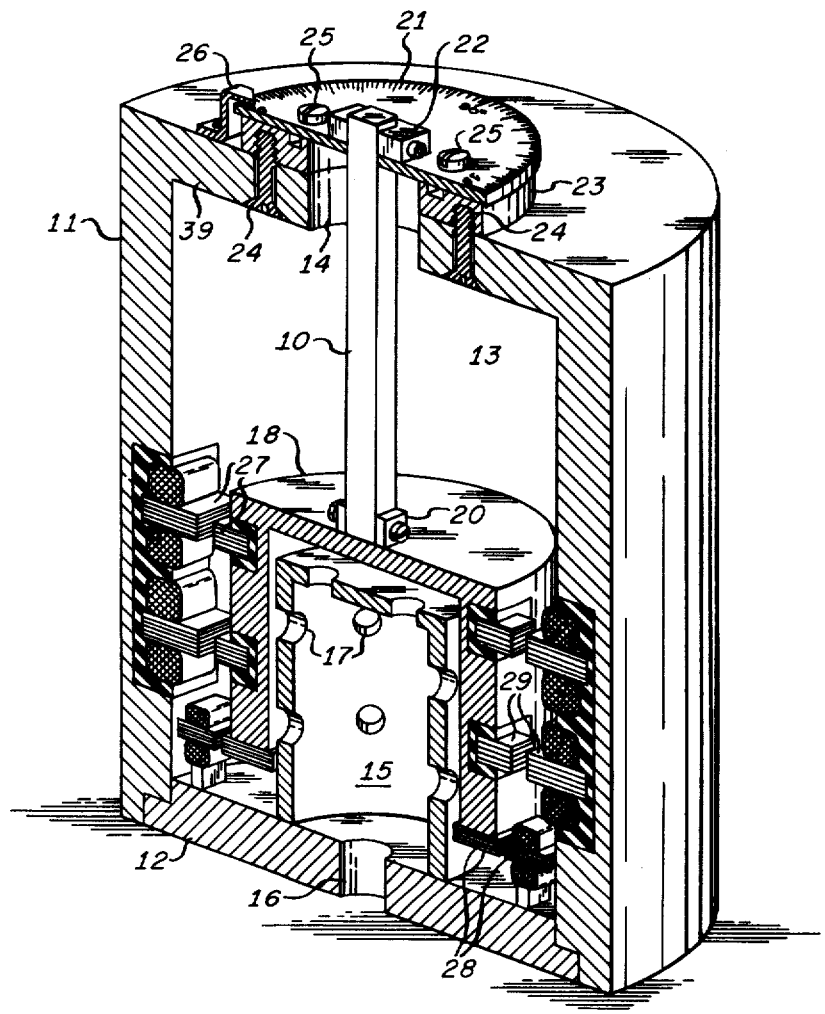
FIG. 1 shows a material testing device constructed in accordance with the device of the subject invention.

FIG. 1 shows a test specimen 10 which is to be subjected to a torsion test and its stress relaxation measured. A stationary housing 11 which is cylindrical in shape has a removable base 12 and an inner chamber 13. The stationary housing 11 has an access port 14 in the top. Mounted to the base 12 within the chamber 13 is a cylindrical air manifold 15 having an air intake vent 16 in the base 12 and a plurality of outlet vents 17 in the top and wall of the air manifold 15. Also, positioned within the chamber 13 and incasing air manifold 15 is a rotatable element 18, a hollow cylinder with its top enclosed. Air emitted from the outlet vents 17 is directed against the underside of the top and inner wall of the rotatable element 18 suspending it above the air manifold 15. The rotatable element 18 is then free to rotate about its vertical axis. One end of the test specimen 10 is attached to the rotatable element 18 by means of a lock screw and nut 20. The other end of the material test specimen 10 is attached to a calibration plate 21 through the access port 14 by means of a lock screw and nut 22. A friction plate 23 is mounted to the stationary housing 11 by mounting screws 24. Set screws 25 secure the calibration plate 21 to the friction plate 23 after a calculated stress is applied to the test specimen 10. The friction plate 23 is used to eliminate relative movement between the calibration plate 21 and the test specimen 10. An indicator 26 for indicating the initial position of the calibration plate 21 is fixed to the stationary housing 11. The stator of an electromagnetic spring field 27 is mounted on the inner wall of the stationary housing 11. The rotor of the electromagnetic Spring field 27 is embedded in the outer wall of the rotating element 18. A torque motor 28 has its rotor affixed to the bottom of the rotating element 18 and its stator mounted on the base 12. An inductive pickoff 29 has its rotor embedded in the outer wall of the rotating element 18 and its stator mounted on the inner wall of the stationary housing 11. Single axis inductive pickoffs of a type suitable for this application are well known and are more fully described in the text, "Gyroscope: Theory and Design" by Savet, McGraw-Hill 1961, pages 332-334.

Figure 2:
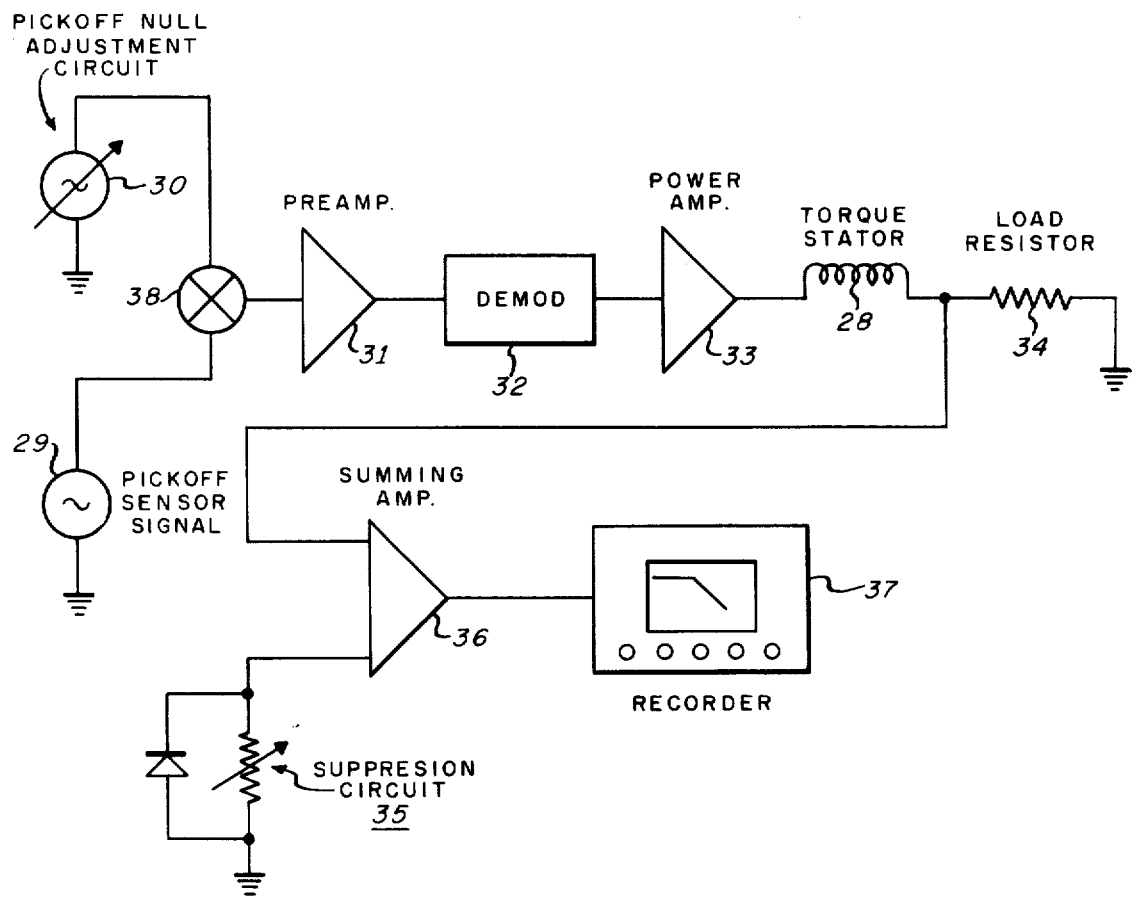
FIG. 2 is a schematic representation of the electronic circuitry used for maintaining constant strain and measuring stress relaxation in the material test specimen.

In operation, the electronics shown in FIG. 2 are employed to position the rotatable element 18 at a null position, i.e. no error signal output from the inductive pickoff 29, and air is admitted to the air manifold 15. A calculated stress is applied to the test specimen 10 by rotating calibration plate 21 to a specific angular position at which it is secured by means of the set screws 25. While the plate 21 is rotated, the electromagnetic spring field 27 develops a torque of sufficient magnitude to maintain the rotatable element 18 at its null position. This torque is used to cancel the torque applied to the test specimen 10 through rotation of the plate 21 thereby increasing the sensitivity of the testing device to small changes of torque from the test specimen 10 resulting from stress relaxation of the material. The torque required to maintain the resulting strain constant is provided by the torque motor 28. Any change in position of the rotatable element 18 relative to the stationary housing 11 due to stress relaxation of the material generates an error signal proportional to the change in position of the rotatable element 18. This error signal is coupled through an electronics circuit, shown in FIG. 2 and described below, to the stator windings of the torque motor 28. Since the change in position of the rotatable element 18 results from the reduced torque produced by the test specimen 10 due to the stress relaxation in the material, the torque developed by the torque motor 28 is the total torque required to restore the rotatable element 18 to its initial position thereby maintaining the resultant strain constant.

As shown in FIG. 2, the pick-off 29 contains a null adjustment circuit 30 for setting a null point proportional to the position of the rotatable element 18. The output of the pickoff 29 is applied to a first input on a summation circuit 38 and the output from the null adjustment circuit 30 is applied to a second input on the summation circuit 38. The error signal generated by the pick-off 29 is coupled through the summation circuit 38 to a preamplifier 31 for increasing the magnitude of the error signal. The amplified error signal is routed to a demodulator 32 which removes the carrier frequency of the error signal. The demodulated error signal is amplified in a power amplifier 33. The amplified signal is connected to the stator windings of the torque motor 28 and to a load resistor 34 for developing an error voltage proportional to stress relaxation. An adjustable suppression circuit 35 generates a threshold voltage that is combined with the error voltage of the load resistor 34 in a summing amplifier 36 resulting in a difference error voltage of greater sensitivity. The difference error voltage is routed to a recorder 37 where a record of the stress relaxation versus time is produced.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. An apparatus for measuring material characteristics including material stress relaxation comprising,
   first rotatable means having first securing means for rigidly affixing an extremity of a material test specimen, said rotatable means being coupled to stationary housing means,
   second rotatable means having second securing means for rigidly affixing a second extremity of said material test specimen, said second rotatable means disposed within said stationary housing means,
   first forcing means for applying a force to said second rotatable means proportional to a force applied to said first rotatable means providing rotational displacement of said test specimen,
   second forcing means responsive to an error signal for applying a force to maintain said second rotatable means at a null position, and
   sensing means for detecting displacement of said second rotatable means relative to said null position and generating said error signal which is proportional to the magnitude of said displacement, said error signal being indicative of said material stress relaxation in said test specimen.

2. A material testing device for measuring stress relaxation comprising,
   first rotatable means having first securing means for rigidly affixing an extremity of a material test specimen, said rotatable means being coupled to stationary housing means,
   second rotatable means having second securing means for rigidly affixing a second extremity of said material test specimen, said second rotatable means being disposed within said stationary housing means,
   air venting means for maintaining said second rotatable means suspended on an air bearing, free to rotate about the vertical axis of said second rotatable means,
   first torquing means for applying a torque to said second rotatable means proportional to a torque applied to said first rotatable means providing rotational displacement of said test specimen,
   second torquing means responsive to an error signal for applying a torque to maintain said second rotatable means at a null position,
   sensing means for detecting displacement of said second rotatable means relative to said null position and generating said error signal which is proportional to the magnitude of said displacement, said error signal being indicative of said material stress relaxation in said test specimen, and
   display means responsive to said error signal for continuous display of said stress relaxation.

3. A material testing device comprising,
   cylindrical stationary housing means having a removable base, an access port in its head and an inner chamber,
   calibrated rotatable plate means coupled to said stationary housing means having securing means for rigidly affixing one end of a material test specimen and providing rotatable displacement of said material test specimen,
   cylindrical air manifold means mounted on said removable base within said inner chamber having an air inlet vent extending through said removable base and a plurality of air outlet vents in the head and wall of said air manifold,
   cylindrical rotatable means with an open base incasing said air manifold and free to rotate about its vertical axis when suspended on a cushion of air vented through said plurality of air outlet vents, having securing means for affixing a second end of said material test specimen,
   an electromagnetic spring field for applying a torque proportional to said displacement of said material test specimen,
   electronic sensing means having an adjustable null position for detecting displacement of said cylindrical rotatable means from a null position,
   preamplifier means connected to said sensing means for amplifying said error signal,
   demodulator means responsive to said amplified error signal for removing the carrier frequency from said error signal,
   power amplifier means for amplifying said demodulated error signal, providing an amplified error signal,
   torque motor means responsive to said amplified error signal for returning said rotatable means to its null position,
   load resistor means for developing a voltage proportional to said amplified error signal,
   suppression circuit means including constant current source means for developing a threshold signal,
   summing amplifier means coupled to said suppression circuit means and said load resistor means for producing a difference signal equivalent to the difference between said threshold signal level and said load resistor voltage, and
   display recorder means for providing a recorded display of said difference signal which is indicative of the stress relaxation in the material test specimen.

* * * * *